March 21, 1950  C. W. KRAFT  2,500,951
TREATMENT OF ALCOHOLIC LIQUOR
Filed May 13, 1947  2 Sheets-Sheet 1

Inventor:
Clarence W. Kraft
Henry Hesh
Attorney.

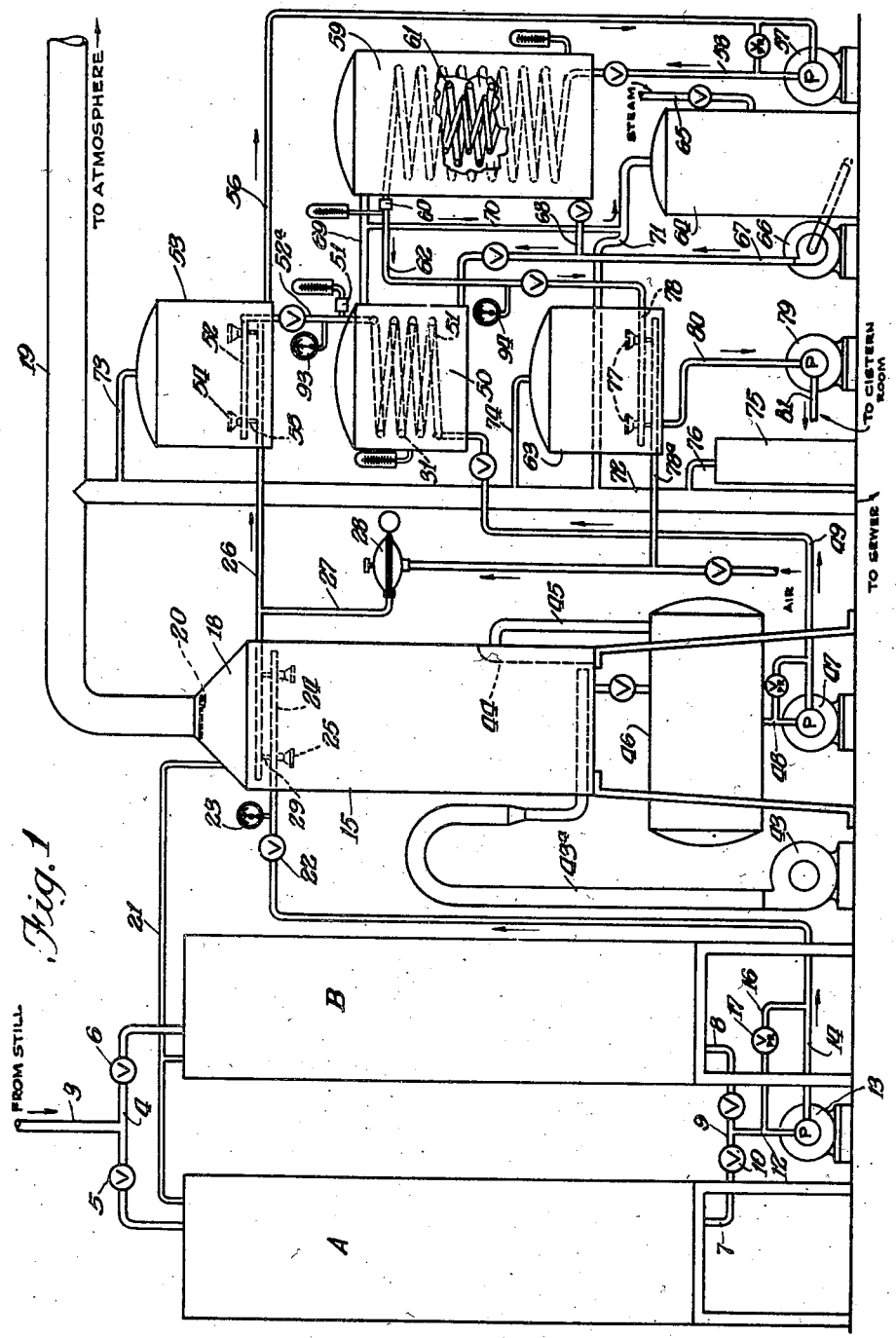

Patented Mar. 21, 1950

2,500,951

UNITED STATES PATENT OFFICE 2,500,951

TREATMENT OF ALCOHOLIC LIQUOR

Clarence W. Kraft, Chicago, Ill., assignor to Disticraft, Inc., Chicago, Ill., a corporation of Illinois Application May 13, 1947, Serial No. 747,770

27 Claims. (Cl. 99—48)

The present invention relates to the treatment of alcoholic liquor, and more particularly to modifying and mellowing of raw, green or immature spirituous liquor.

Raw fermented alcoholic liquor contains harsh and disagreeably flavored compounds, including the fusel oil which must be split up, modified, recombined or separated before the liquor is suitable for beverage purposes. This fusel oil while containing harmful compounds, also contains or generates by appropriate treatment elements to which the refined spirit owes its body, aroma, "bouquet" or flavor. The fusel oil present in the raw liquor consists mainly in the alcohols such as propyl, butyl, and active and inactive amyl alcohol. In addition to the fusel oils, raw or green alcoholic liquor including newly produced whiskey contains various other secondary bodies, such as acids, aldehydes, furfural, esters, and ethers, which affect the aroma, "bouquet," or mellowness of the liquor, and when modified are therefore desirable to retain.

The object of the present invention is to accelerate and complete the maturing of raw fermented alcoholic liquor, simultaneously producing a finished product suitable for beverage purposes, said product having its raw and injurious ingredients removed or refined and having body, aroma, "bouquet," or flavor and mellowness superior to naturally matured alcoholic liquor, that is, liquor which has been aged in heated oscillating charred oak barrels, or their equivalent, for a number of years. This improvement is possible, due to a positively controlled method of refining. While the present invention is applicable to the treatment of all fermented alcoholic liquors, it is particularly adapted for the production of richly aromatic and well-flavored whiskies and brandies.

Broadly, the present invention comprises subjecting the liquor under pressure in a heated state to the action of a material adapted to eliminate and modify by splitting up into milder compounds the fusel oil and secondary bodies of the liquor, heating the resulting liquor to a temperature sufficient to release the harsh constituents of the disintegrated fusel oil and secondary bodies but insufficient to boil the ethyl alcohol content of the liquor, then by separating the released injurious ingredients from the liquor bodies and the fusel oil and separating the undesirable constituents from the liquor.

The present invention comprises the steps of the novel method for treating the newly produced whiskey which is described and illustrated in the accompanying drawing, in which Fig. 1 is a diagrammatically shown apparatus presenting a preferred organization of elements for carrying out the invention.

Figure 1A:
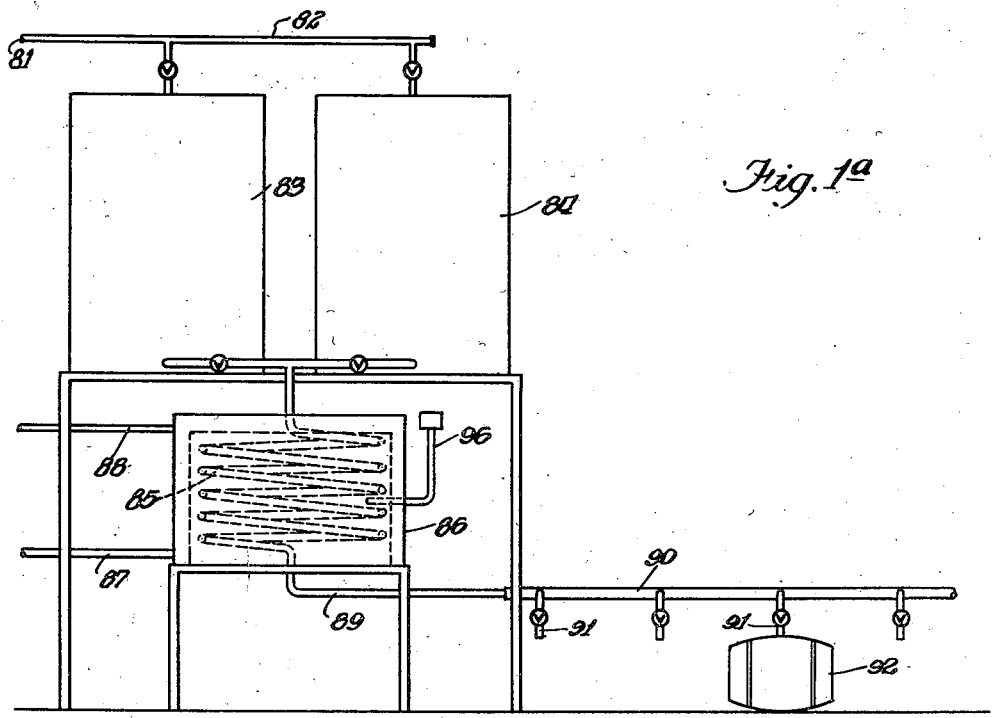
Fig. 1a is a continuation of Fig. 1.

In describing the process only those parts of the apparatus are referred to which are necessary for an understanding of the invention.

The newly produced raw whiskey is delivered from the still by a pipe 3 to a manifold 4 which is provided with manifold valves 5 and 6 and is connected to supply or storage tanks A and B. Pipes 7 and 8 respectively connected to tanks A and B lead to a manifold 9 provided with valves 10 and 11 and a pipe 12 connects the manifold to the intake side of a pump 13 whence a pipe 14 conducts the liquor to the top of break up or cracking tank 15.

A pipe 16 directly connects the pipe 12 with pipe 14 by-passing the pump 13 and being provided with a valve 17.

The tank 15 is provided with a dome 18 whence a pipe 19 leads to the atmosphere. A baffle 20 is provided in the dome.

A vent manifold 21 is connected to the supply tanks A, B and to the dome 18 and is thus connected to the atmosphere by pipe 19.

The pipe 14 is equipped with a valve 22 and a pressure gauge 23 and leads to a manifold 24 in the tank which is equipped with several release valves 25.

A manifold 26 is connected by a pipe 27 to a source of compressed air and is provided with a pressure regulator 28.

Pipes 29 connect the manifold 24 with the interior of each release valve 25.

Figure 2:
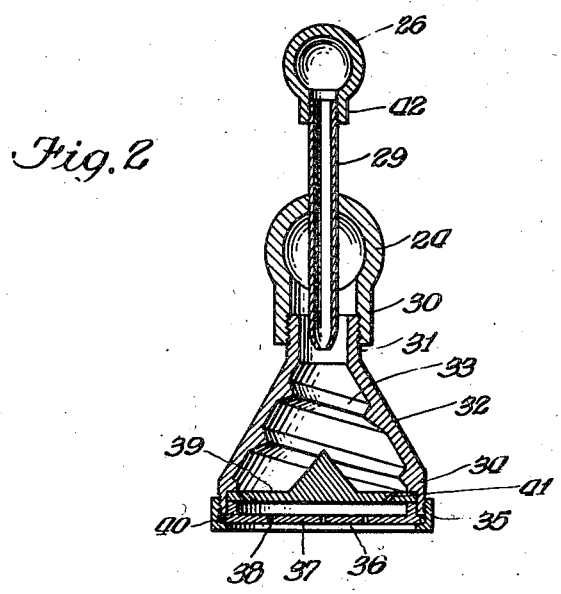
Fig. 2 is a sectional elevation of the release valve employed.
Figure 3:
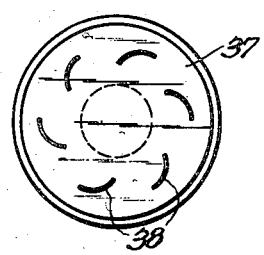
Fig. 3 is a bottom plan view of the valve.

Referring to Fig. 2 the release valve 25 is shown in detail and comprises a nipple 30 into which is screwed a tubular extension 31 at the smaller end of a conical head 32 which on the inside is provided with a spiral rib 33.

At the large end the head 32 is provided with a tubular extension 34 threaded on the outer side to have secured thereto a threaded cap 35 which is provided with a large opening 36 to expose a metering plate or disk 37 which is provided with a plurality of arcuate passages 38 arranged substantially in a circle.

The disk 37 is interposed between the large end of the heat 32 and the cap 35.

Slightly spaced above the disk 37 is a baffle disk 39 resting on an annular flange 40 of the disk 37, extension 34 and provided with a plurality of passages 41.

The pipe 29 extends from a nipple 42 of the compressed air manifold 26 into the tubular extension 31.

It is evident that the flow of liquor is retarded through the release valves in which the spiral ribs cause a whirling flow and the baffle disk 39 together with the disk 37 and the narrow passages 38 prevents a free flow.

The compressed air emanating from the pipe 29 forces a disintegration or cracking of the liquor through the passages 41 causing a breaking of the globule casement.

The compressed air is introduced under suitable pressure which may greatly vary for different kinds of liquor depending upon its physical and chemical characteristics. In general, the air pressure may vary from two to three pounds per square inch above temperature to twenty-five pounds per square inch above temperature.

While these are the preferred limits it is, of course, within the scope of the present invention to greatly increase this pressure, especially when the cracking of the liquor is to be carried out to a high degree.

The release valves 25 play an important role in the successful carrying out of the process since the pump 13 causes the liquor to flow under a certain pressure into the release valves and by reason of the retardation the pressure is maintained and upon discharge from the release valve which is in the nature of an explosion the liquor is cracked or broken into minute globules.

The liquor globules collect at the bottom of tank 15 and are there mixed with air which is supplied by a blower 43 and pipe 43a causing an impregnation of liquor with air.

The tank 15 is provided with a baffle 44. A pipe 45 connected to the tank 15 above its bottom delivers the mixture of liquor and air to a supply tank 46.

A pump 47 is connected with tank 46 by a pipe 48 and delivers by a pipe 49 the mixture under pressure to a temperature tank 50 wherein the temperature is minutely and automatically controlled by a thermostat 51. The temperature is maintained between 75° and 110° F. although the temperature range may be varied in accordance with specific requirements.

The mixture flows through a series of coils 51 and thence to a manifold 52 by a pipe 52a in cracking or breaking up tank 53 equipped with release valves 54 similar to the release valves 25. Pipes 55 lead from the compressed air manifold to the interior of the valves 25. The function of cracking or break up tank 53 is similar to that of tank 15.

The mixture flows from tank 53 through a pipe 56 to a pump 57 whence it is pumped through a pipe 58 into a tank 59 wherein the liquor mixture is heated up to proper temperature and maintained at required pressure.

A thermostat 60 minutely and automatically maintains the necessary temperature of approximately 110° F. but any variation therefrom may be resorted to depending on the nature and ingredients of the liquor. The liquor is pumped through a series of coils 61 in tank 59 and flows through a pipe 62 into a tank 63 where the liquor is maintained under somewhat higher temperature and pressure.

A hot water tank 64 is connected by a pipe 65 to a steam supply (not shown) and a pump 66 pumps the hot water through a pipe 67 into tank 50 at the bottom thereof. A pipe 68 connects pipe 67 with the tank 59 near the bottom thereof.

An overflow pipe 69 connects the tanks 50 and 59 near the top thereof and is also connected to a return pipe 70 which leads to the top of hot water tank 64.

In the event of overflow of the tank 64 a pipe 71 leads to a condenser pipe 72 which leads to the sewer and also connects to the pipe 19 leading to the atmosphere.

The condenser pipe is also connected by a pipe 73 with the tank 53 at the top thereof and by a pipe 74 with tank 63.

A tank 75 is further connected by a pipe 76 to the condenser pipe 72 and serves for the accumulation of by-products.

The tank 63 is provided with release valves 77 communicating with the manifold 78 which forms the continuation of pipe 62. A pipe 78a serves to introduce compressed air into the release valves 77. A pump 79 has its inlet side connected to tank 63 by pipe 80, and its discharge side connected by a pipe 81 to a manifold 82 whence the end product enters into cistern or supply tanks 83, 84.

From there the end product is discharged into a coil 85 in a hot water tank 86 to which hot water or steam is introduced by a pipe 87. A pipe 88 provides for the escape of overflow. A thermostatic control 96 is provided for the tank 86.

A pipe 89 leads from the bottom of tank 86 to a manifold 90 whence a plurality of valved outlets 91 permits the filling of barrels 92 from which the end product may be discharged for consumption.

In order to control the pressure the pipe 52a leading to tank 53 is provided with a gauge 93 and similarly the pipe 62 leading to tank 63 is equipped with a pressure gauge 94.

The described process aims at subjecting the raw whiskey to a series of cracking operations or fractional crackings, whereby the deleterious ingredients of fusel oil, furfural and many of the higher alcohols are attacked.

To this end the raw whiskey is 1. cracked in tank 15,
2. subjected to the influence of temperature and pressure in tank 50 in a closed coil 51,
3. again cracked in tank 53,
4. subjected to the influence of temperature and pressure in a closed coil, and
5. finally cracked in tank 63.

The pressures maintained in the carrying out of the process are above atmospheric pressure and are automatically controlled.

The temperatures under which the process is carried out has been in excess of 110° F. up to 168° F. and as established by actual tests. These pressures and temperatures have had no apparent noticeable effect on the ethyl alcohol content of the whiskey but have a definite effect and show desirable changes in other component parts of the whiskey after it is released from pressure and is immediately discharged into barrels at a temperature preferably of about 100° F. In the barrels the whiskey is allowed to knit and absorb the organic bodies of the charred oak while it is cooling to normal warehouse temperature. The resulting product, as established by actual experience and test, has been pronounced by authorities to produce a superior product.

It is further pointed out that whiskey in the accepted sense of the word always contains fusel oil. According to the invention the harsh components of the fusel oil or by-products are cracked and released at the indicated temperatures.

A chemical analysis of the by-products obtained by applicant's process was carried out with the following results:

| | |
|---|---|
| Specific gravity | 0.9061 |
| Proof | 126.38 |
| Absolute alcohol by volume____per cent__ | 63.19 |
| Total solids_____gram per 100 cc__ | 0.018 |
| Ash _____do____ | 0.014 |
| Total acidity as an acetic acid_____do____ | 0.008 |
| Volatile acidity as acetic acid_____do____ | 0.008 |
| Esters _____do____ | 0.0072 |
| Aldehydes | Nil |
| Furfural _____gram per 100 cc__ | 0.0001 |
| Fusel oil _____do____ | 0.1306 |
| Methyl alcohol | None |
| Denaturants | None |

A chemical analysis of the end product furnished the following results:

Analysis:
| | |
|---|---|
| Proof | 99 |
| Absolute alcohol by volume_per cent_ | 49.5 |
| Total solids_____grams per 100 cc__ | 0.1090 |
| Total acidity as acetic acid_____do____ | 0.0235 |
| Volatile acidity as acetic acid__do____ | 0.0079 |
| Esters as ethyl acetate_____do____ | 0.0165 |
| Aldehyde as acetaldehyde_____do____ | 0.0055 |
| Furfural _____do____ | 0.0008 |
| Amyl alcohol ___ _____do____ | 0.1073 |
| Added sugar | None |
| Added glycerine | None |
| Added coloring (caramel) | None |
| Added extracts | None |

Denaturants:
| | |
|---|---|
| Methyl alcohol | None |
| Acetone | None |
| Iso-propyl alcohol | None |
| Diethylphthalate | None |
| Other denaturants | None |

The foregoing analysis definitely established that the product obtained according to my improved process is a pure grade of whiskey, found to be free from added foreign extracts, coloring matter or essences.

It contains none of the objectionable features commonly found in raw whiskey, the latter usually possessing harshness slop odor and acridness (rawness).

My end product shows a fairly well balanced ratio of acids and esters low in aldehydes and furfural and well below the average of fusel oil content found in older whiskies and which make up the so-called heavier portion of the secondary constituents.

The whiskey produced according to my process is a pure, potable whiskey of good quality and superior to whiskey produced in standard manner.

The process is automatic and continuous and no aging is necessary. The treated liquor when reaching the cistern tanks is discharged therefrom and subjected to heat preparatory to being drawn into barrels and is ready for consumption.

I claim:

1. The process of treating raw alcoholic liquors containing deleterious components of the higher alcohols which comprises subjecting the liquor repeatedly to cracking by admixture with compressed air and explosive release into a confined space, and then to the influence of heat and to pressure above atmospheric and mingling the liquor with air prior and subsequent to cracking to separate the deleterious components, and removing said components from the liquor.

2. The process of treating raw alcoholic liquors containing deleterious components of the higher alcohols which comprises subjecting the liquor repeatedly to cracking by admixture with compressed air and explosive release into a confined space, and then to the influence of heat between 75° and 168° F. and pressure above atmospheric, mingling the liquor with air prior and subsequent to cracking, and removing as volatile extracts portions of deleterious components separated from the liquor by said cracking.

3. The process of treating raw alcoholic liquors containing deleterious components of the higher alcohols which comprises subjecting the liquor at least three times to cracking by admixture with the raw liquor of compressed air and explosive release of the mixture, and to the influence of increasing heat up to 168° F. and to increasing pressure above atmospheric between cracking operations, mingling the liquor with air prior and subsequent to cracking, and removing the deleterious components separated from the liquor by cracking as volatile extracts.

4. The process of treating raw alcoholic liquors containing deleterious components of the higher alcohols which comprises subjecting the liquor to cracking while under constant pressure above atmospheric, subsequently heating the liquor and subjecting the heated liquor to an increased constant pressure, mingling the liquor with air prior and subsequent to cracking, and leading off deleterious volatile components separated from the liquor by cracking.

5. The process of treating raw alcoholic liquors containing deleterious components of the higher alcohols which comprises subjecting the liquor to pressure above atmospheric, retarding the flow of the liquor to maintain said pressure constant, cracking the liquor under slight explosions to break the liquor into minute particles to thereby separate the deleterious components from the liquor, impregnating the particles with air, and removing said deleterious components.

6. The process as set forth in claim 5, wherein the cracking is repeatedly carried out at increased but constant pressure.

7. The process as set forth in claim 5, wherein the cracking is repeatedly carried out at increased but constant pressure and increased heat up to 168° F.

8. The process of treating raw alcoholic liquors containing deleterious components of the higher alcohols which comprises forcibly flowing the liquor in a line and subjecting the liquor to heat and pressure above atmospheric, retarding the flow of the liquor to maintain said pressure constant, repeatedly cracking the liquor under slight explosions by release from said line into confined space to break the liquor into minute particles to thereby separate volatile deleterious components, recollecting the particulated liquor between cracking operations and reflowing same, impregnating the particles with air and removing said deleterious components.

9. The process of treating raw alcoholic liquors containing deleterious components of the higher alcohols which comprises subjecting the liquor repeatedly to increasing heat between 75° and 168° F. and to increasing pressures above atmospheric between 2 to 25 lbs., retarding the flow of the liquor in a cracking manifold to maintain said pressure constant, repeatedly cracking the liquor with compressed air from said manifold under slight explosions to break the liquor into minute particles thereby releasing deleterious components, impregnating the particles with air, and removing volatile portions of said deleterious components from above the cracked liquor.

10. The process of treating raw alcoholic liquors containing deleterious components of the higher alcohols which comprises subjecting the liquor to heat and pressure above atmospheric by injecting air into the liquor while in a closed coil, retarding the flow of the liquor to maintain the pressure constant, cracking the liquor under compressed air explosions to break the liquor into minute particles and forcing air through the cracked products to modify and extract the deleterious components, impregnating the particles with air and removing said deleterious components.

11. The process of treating raw alcoholic liquors containing deleterious components of the higher alcohols which comprises subjecting the liquor repeatedly to compressed-air cracking to atomize the same and confining the cracked liquor to a flow line which is subjected to the influence of heat and to pressure above atmospheric between cracking operations, mingling the liquor with air subsequent to at least one cracking operation to separate volatile components, removing said components from the liquor by air exhaust, drawing the liquor into cisterns, and subjecting the liquor to heat prior to filling in barrels.

12. A rectification process for alcoholic liquors of the class of raw whisky which comprises cracking said liquor under air pressure above atmospheric a first time to form particles, aerating said particles, collecting the particles as a liquid and cracking the collected product a second time, collecting the second cracking product as a liquid, heating the second cracking product, and cracking the same a third time and heating the third cracking product and reforming the same as a liquid.

13. A rectification process for alcoholic liquors of the class of raw whisky, comprising cracking said liquor under pressure above atmospheric, aerating and liquifying the first cracking product, and cracking and liquifying the first cracked product a plurality of times thereafter with heat treatment of the liquified cracking products after the first at a temperature of approximately 110° F.

14. The process of treating raw alcoholic liquor containing ethyl alcohol and deleterious components inclusive of higher alcohols including amyl alcohol, which comprises: breaking the raw liquor into minute particles by explosive release of the liquor under pressure above atmospheric into a confined space, injecting air into the particulated liquor, collecting the particulated product as a liquid heating the last-mentioned product between the limits of 75–168° F., and removing deleterious components including portions of amyl alcohol as condensation products extracted from said space.

15. The process of claim 14 further distinguished by provision of additional exploding and heating phases with condensation extraction of additional portions of said higher alcohols in each phase, and negligible extraction of portions of ethyl alcohol in any phase.

16. A rectification process for raw alcoholic liquors of the class of whisky known to contain ethyl alcohol and amyl alcohol, said process comprising a phase of explosive breaking up of the liquor into particles by release into confined space under 2 to 25 lbs. pressure, collecting the particles as a liquid, heating the collected liquid in confinement to a temperature below the boiling point of ethyl alcohol, and a further phase similarly exploding the heated liquid in confinement, and collecting amyl alcohol components as condensation products from above one or more exploding phases.

17. A rectification process for raw whisky comprising exploding the same into a confined space under pressure into particles, aerating the first exploded product and reforming same as an air-bearing liquid, exploding the latter liquid and reforming as a liquid, heating the last-mentioned product between 75 and 168° F., exploding and reforming a third time, and collecting condensates from above each exploding phase separately from the reformed liquid.

18. The process of claim 17 further characterized by collecting the last explosion product, and heating with immediate transfer into barrels while hot.

19. The process of treating raw alcoholic liquors containing deleterious components of the higher alcohols which comprises: cracking in successive stages by admixing the liquor under pressure with air under pressure, both above atmosphere, in a cracking manifold to particulate the liquor and project the particles into a closed chamber having an outlet for volatile matter, collecting the particulated liquor in liquid phase in said chamber, forcing air through said collected particles, flowing said last liquid phase through a heating coil for heating to a temperature between 75° and 168° F., again cracking the liquid phase as aforesaid and again liquifying the second cracking product and flowing the liquid phase thereof through a heating coil to heat the said liquid phase to a temperature between 75° and 168° F., and again cracking the last-mentioned liquid phase as aforesaid and liquifying the cracked product.

20. A rectifying process for raw alcoholic liquor comprising cracking by delivery of the raw liquor and air, both under pressure above atmospheric, between 2 and 25 lbs./in.², into an atomized manifold to particulate the liquor explosively into a closed cracking chamber, having an outlet for volatile substances, collecting the particulated liquor as a liquid, forcing aerating air through the collected liquid, flowing the collected and aerated liquid through a first heating phase at a temperature ranging from 75° to 110° F., and again cracking as aforesaid the liquid in heated phase and again collecting the cracked liquor in liquid phase, subjecting the last-mentioned liquid phase to a second heat treatment at a temperature above that in the first-mentioned heating phase but not higher than 168° F. and immediately cracking, as aforesaid, the liquid in said second heating phase and collecting the particulated liquor in liquid phase as the end product.

21. A rectification process for raw alcoholic liquor of the class of whiskey known to contain ethyl and amyl alcohol for the purpose of modifying the amyl alcohol content thereof and to enhance potability, said process comprising cracking the raw whiskey by projecting the same in particulated state in admixture with compressed air into a confining space having egress for volatile substances, immediately collecting the particulated liquor in liquid phase, aerating the body of said liquid phase by passage of air therethrough, heating the aerated liquid phase above 75° F. but not above 168° F., and thereafter repeating said cracking, liquifying, and heating operations a desired number of times to procure a liquid end product having a desired amyl alcohol content lower than that of the raw whiskey initially charged into the process and having an optimum ethyl alcohol content.

22. The process of treating potable raw alcoholic liquors known to contain ethyl alcohol and deleterious components including amyl alcohol, which process comprises the steps of cracking the liquor in successive stages by flowing the raw liquor under pressure above atmospheric into a valved manifold having atomizing passages therefrom in confluence with compressed air in said manifold at pressures from about 2 to 25 lbs./in.$^2$ to expel the liquor explosively from the manifold into a confined space in particulated condition, said space having egress for volatile products, collecting the particulated cracked liquor in liquid phase, flowing said liquid phase under pressure above atmospheric through a heat exchanging means to heat the said liquid phase ranging between about 75° to 168° F. and constituting the heated phase of the cracked liquor, and immediately repeating said cracking, liquifying, and heating operations one or more times in successive stages and in the order named, to procure as an end product liquor having an optimum ethyl alcohol content with reduced content of amyl and higher alcohol components.

23. The process of claim 22 further characterized in that at least one liquid phase following the first cracking shall be impregnated with air by passage of an aerating stream through the body thereof.

24. The process of claim 23 further characterized in that at least one said heating phase after the first shall be effectuated at a temperature elevated above the temperature of the preceding heating phase but within the temperature limits of 75° to 168° F.

25. A process for treating raw whiskey known to contain ethyl and amyl alcohols, at least, and which comprises in a first stage a cracking operation, defined as a breaking up of the liquid whiskey into fine particles by projection into confined space under pressure above atmosphere in admixture with compressed air, in a manifold, said cracking operation being followed by a liquifying operation to collect the particles again in liquid phase, said liquifying operation being followed by a heating operation in which the said liquid phase is heated to a temperature of about 110° F., with repetitions a desired number of times of said cracking, liquifying and heating operations in the order named in subsequent stages.

26. The process of claim 25 in which the liquid phase following a said cracking operation is impregnated with air in at least one stage by forcing air through the liquid body.

27. The process of claim 25 in which the temperature between the stated limits is increased in each heating operation following the first, and the liquor from the last liquid phase is transferred into barrels at a temperature of about 100° F.

CLARENCE W. KRAFT.

REFERENCES CITED

The following references are of record in the file of this patent:

UNITED STATES PATENTS

| Number | Name | Date |
|---|---|---|
| 1,990,266 | Caywood | Feb. 5, 1935 |
| 2,032,818 | Sweek et al. | Mar. 3, 1936 |
| 2,036,167 | Cox | Mar. 31, 1936 |
| 2,050,908 | Willkie | Aug. 11, 1936 |
| 2,055,060 | Barker | Sept. 22, 1936 |
| 2,086,080 | Herrick | July 6, 1937 |
| 2,108,030 | Darrah | Feb. 8, 1938 |
| 2,145,243 | Bagby | Jan. 31, 1939 |